United States Patent
Mehra et al.

(10) Patent No.: US 7,383,290 B2
(45) Date of Patent: **\*Jun. 3, 2008**

(54) TRANSACTION PROCESSING SYSTEMS AND METHODS UTILIZING NON-DISK PERSISTENT MEMORY

(75) Inventors: Pankaj Mehra, San Jose, CA (US); Sam Fineberg, Palo Alto, CA (US); Gary S. Smith, Auburn, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 387 days.

This patent is subject to a terminal disclaimer.

(21) Appl. No.: 10/797,258

(22) Filed: Mar. 9, 2004

(65) Prior Publication Data

US 2005/0203961 A1     Sep. 15, 2005

(51) Int. Cl.
*G06F 17/30* (2006.01)

(52) U.S. Cl. .......................... 707/202; 707/8

(58) Field of Classification Search ............... 707/101, 707/202, 8, 200, 201
See application file for complete search history.

(56) References Cited

U.S. PATENT DOCUMENTS

| | | | |
|---|---|---|---|
| 5,561,795 A * | 10/1996 | Sarkar | 707/202 |
| 5,706,511 A | 1/1998 | Tomoda | |
| 6,272,607 B1 * | 8/2001 | Baentsch et al. | 711/162 |
| 6,493,837 B1 | 12/2002 | Pang | |
| 6,578,160 B1 | 6/2003 | MacHardy, Jr. et al. | |
| 2003/0009477 A1 * | 1/2003 | Wilding et al. | 707/104.1 |
| 2003/0131039 A1 | 7/2003 | Bajoria | |
| 2004/0199924 A1 * | 10/2004 | Ganesh et al. | 719/313 |
| 2005/0203974 A1 * | 9/2005 | Smith et al. | 707/204 |

FOREIGN PATENT DOCUMENTS

DE     19819205     11/1999

\* cited by examiner

*Primary Examiner*—Cheryl Lewis (57) ABSTRACT

In at least one embodiment, transaction processing systems comprise non-disk persistent memory that is utilized to commit transactions.

24 Claims, 7 Drawing Sheets

TRANSACTION PROCESSING SYSTEMS AND METHODS UTILIZING NON-DISK PERSISTENT MEMORY

BACKGROUND

Transaction processing systems are computer hardware and software systems that support concurrent execution of multiple transaction programs while ensuring preservation of so-called ACID properties comprising Atomicity, Consistency, Isolation and Durability. A transaction program is a specification of operations that are applied against application state, including the order in which the operations must be applied and any concurrency controls that must be exercised in order for the transaction to execute correctly. The most common concurrency control operation is locking, whereby the process corresponding to the transaction program acquires either a shared or exclusive lock on the data it reads or writes. A transaction refers to a collection of operations on the physical and abstract application state, usually represented in a database. A transaction represents the execution of a transaction program. Operations include reading and writing of shared state.

With respect to the ACID properties, atomicity refers to transactions that exhibit an all-or-none behavior, in that a transaction either executes completely or not at all. A transaction that completes is said to have committed; one that is abandoned during execution is said to have been aborted; one that has begun execution but has neither committed nor aborted is said to be in-flight.

Consistency refers to successful completion of a transaction that leaves the application state consistent vis-à-vis any integrity constraints that have been specified.

Isolation, also known as serializability, guarantees that every correct concurrent execution of a stream of transactions corresponds to some total ordering on the transactions that constitute the stream. In that sense, with respect to an executed transaction, the effects of every other transaction in the stream are the same as either having executed strictly before or strictly after it. Strong serializability refers to the degree to which the execution of concurrent transactions is constrained and creates different levels of isolation in transaction processing systems. In the context of the current document, concern is greatest with respect to transaction processing systems that exhibit the strongest forms of isolation, in which the updates made by a transaction are never lost and repeated read operations within a transaction produce the same result.

Durability refers to the property such that once a transaction has committed, its changes to application state survive failures affecting the transaction-processing system.

One challenge with transaction processing systems pertains to reducing the time that is needed for transactions to commit. Accordingly, this invention arose out of concerns associated with providing systems and methods that reduce the time that is needed for transactions to commit.

DETAILED DESCRIPTION

Overview

Various embodiments described herein utilize non-disk persistent memory in connection with transaction processing systems. By using non-disk persistent memory to commit transactions, the time associated with committing transactions can be reduced, thus lessening the demand for resources inside the transaction processing system and increasing transaction processing throughput.

Exemplary General Transaction Processing System

Figure 1:
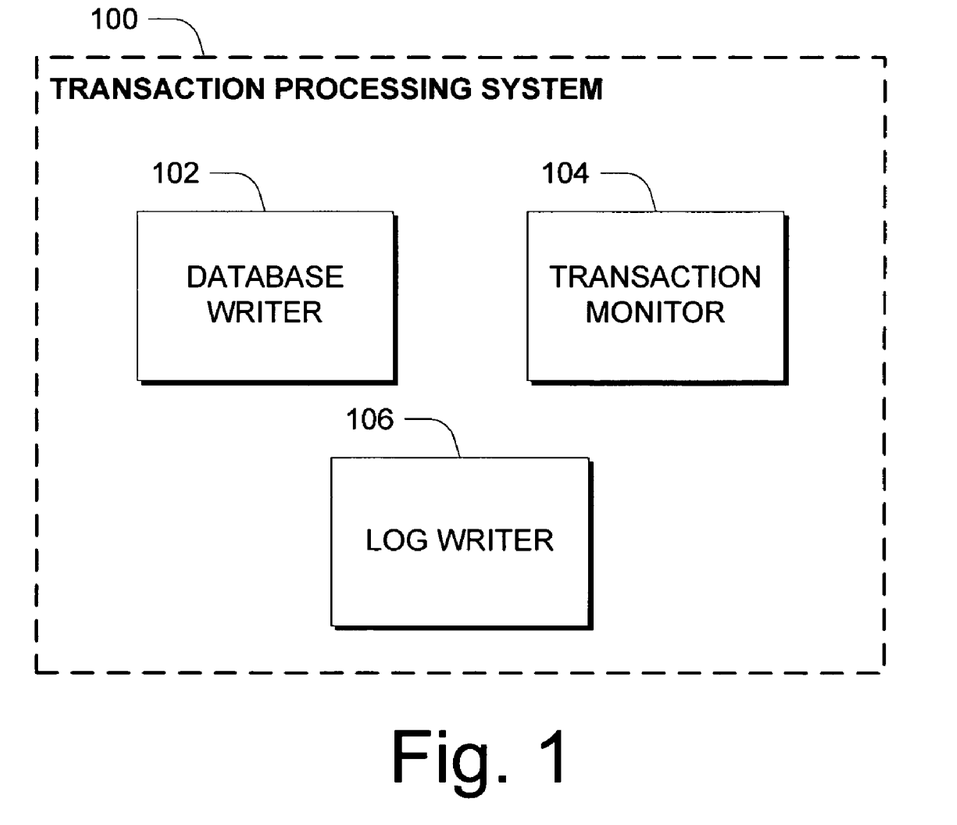
FIG. 1 illustrates an exemplary transaction processing system whose components can be utilized in connection with one or more embodiments.

FIG. 1 shows an exemplary transaction processing system 100 whose components can be utilized to implement the inventive principles described herein. In the described embodiment, transaction processing system 100 comprises a database writer 102, a transaction monitor 104 and a log writer 106.

Database writer 102 is configured to mutate data stored on data volumes (i.e., disks or collections of disks) as it carries out operations specified by the transaction programs. It is not particularly relevant to the discussion here how it preserves the ACID properties other than durability. For durability, the database writer ensures that the changes made by it to the database are recorded on durable media. In on-line transaction processing, the data affected by these changes tend to be randomly distributed on data volumes. Since random access to disk drives is highly inefficient, these changes are not written to the disk right away. Instead, the database writers 102 send their changes to the log writer 106 described below, which makes the changes durable in time for transaction commitment.

Transaction monitor 104 keeps track of transactions as they enter and leave the system. The transaction monitor keeps track of the database writer's 102 mutating the database on behalf of a transaction, and ensures that any data volume changes related to that transaction sent by the database writer 102 to the log writer 106 are flushed to permanent media before the transaction is committed. The transaction monitor 104 also notates transaction states (e.g., commit or abort) in a transaction log.

Log writer 106 maintains a database audit trail, which explicitly records the changes made to the database by each transaction, and implicitly records the serial order in which the transactions committed. Once again focusing on the durability property, before a transaction can commit, the changes made by the transaction must be recorded on durable media. The log writer 106 enforces this constraint; it receives from the database writer 102 audit records describing state changes, and coordinates its recording actions with the rest of the transaction commitment infrastructure described below.

As will be appreciated by the skilled artisan, one or more of the above entities may be realized using multiple processes or threads.

Figure 2:
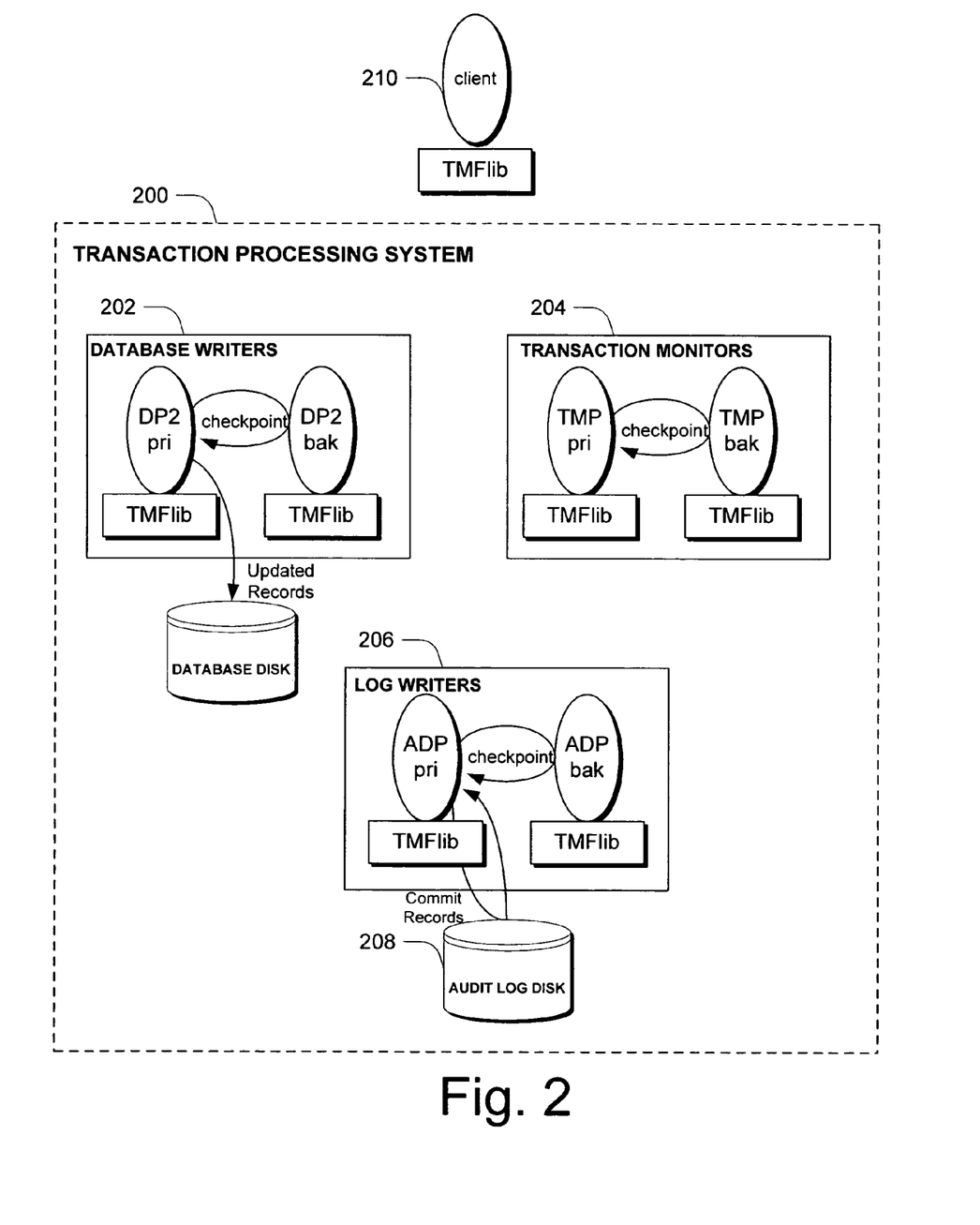
FIG. 2 illustrates one implementation of the FIG. 1 transaction processing system.

FIG. 2 shows an implementation of the transaction processing system of FIG. 1 generally at 200 and comprises database writers 202, transaction monitors 204 and log writers 206.

In this example, each of the components described above is implemented using a pair of processes. Thus, each process pair includes a primary process (labeled "pri") and a backup process (labeled "bak"). In this example, before communicating with any other component of the transaction processing system, each primary process checkpoints the relevant parts of its state to the backup process; in the event that the primary process fails, the backup process can take over quickly. The takeover interval is fairly short (lasting from a few milliseconds to a few seconds), during which in-flight transactions are aborted and possibly restarted. The processes and libraries that realize the elements of the transaction processing architecture in FIG. 2 can be distributed across CPUs.

In this example, database writers 202 are labeled "DP2" (for "Disk Process 2") and log writers 206 are labeled "ADP" (for "Audit Disk Process"). The transaction monitors 204 are implemented using a distributed collection of processes and system libraries, called TMF (for "Transaction Monitoring Facility"). The transaction monitors 204 are labeled "TMP" (for "Transaction Monitor Process") and coordinate the start and commit of transactions. TMF uses an operating system facility called TMFlib (TMF library) at each CPU in the cluster. This library allows the DP2 processes to register with the TMF as they start and end their work with respect to any given transaction. The TMFlib instances communicate among themselves and with the TMP process pair to coordinate transaction commitment, as described below in the section entitled "Committing Transactions".

Committing Transactions

With reference to FIG. 2, the following describes exemplary steps involved in committing a transaction in the case when there is a single log volume (or audit trail disk volume) 208 in the transaction processing system. Typically, a client 210 encounters a Begin_Transaction or similar operation which indicates the beginning of a transaction. The TMFlib on the CPU running the client process notifies the Transaction Monitor Process or TMP about the Begin_Transaction event. TMP assigns the new transaction a transaction ID (TID). The TID is then propagated to database writer 202 and, in particular, to all of the disk processes DP2 that do work on behalf of the transaction. The simple case shown in FIG. 2 involves only a single database writer (comprising a pair of DP2 processes). In a more general case, multiple DP2 process pairs can be involved in processing a transaction.

As the database writer 202 modifies the database state, the DP2 processes propagate a record of the state changes out to the log writers 206 and in particular, the ADP process. The ADP process buffers up state changes in memory until either a threshold on the amount of buffered audit data is exceeded (resulting in a so-called courtesy write) or sooner, if forced to commit by a message from the transaction monitor process 204 (resulting in a so-called forced write).

At a subsequent instant of time, the client will then encounter an End_Transacation or similar operation, which indicates the end of a particular transaction. Before the transaction monitor process 204 can commit the transaction, it needs to ensure, as explained above, that the database state changes sent to the log writer 206 on behalf of the transaction have been made durable. To accomplish this, the TMP sends a Flush message for that particular transaction to the log writer or ADP, and then waits for a message from the ADP confirming that the requisite state changes and the commit record have been flushed from non-durable system buffers out to the disk drives. Upon the transaction monitor 204 receiving the confirmation, it sends a transaction commit record to the ADP and, once the commit record has been written to durable media, notifies the client that the transaction has committed.

From the foregoing, it is evident that waiting for the state changes and commit records to flush to disk accounts for a good portion of the delay in committing TMF transactions, as will be appreciated by the skilled artisan. Since disks are mechanical media, and disk latencies are not improving as rapidly as processor and memory speeds, TMF transaction commit times often range from a few milliseconds to many seconds.

While some applications can tolerate high response times, many others cannot. With high TMF transaction response times, there is a secondary adverse effect on transaction processing throughput due to the fact that an average transaction stays in the system longer, thus causing greater demand for resources inside the transaction processing system, which indirectly limits transaction processing throughput under finite resources.

Persistent Memory in General

In accordance with the embodiments described herein, non-disk persistent memory is employed in connection with a transaction processing system to reduce transaction commit times.

Persistent memory is an architectural concept as will be appreciated by the skilled artisan. In accordance with the described embodiments, there are many possible implementations of non-disk persistent memory that can be utilized. As such, it is not the intent of this document to be limited to one particular embodiment of non-disk persistent memory.

To assist the reader in appreciating architectural principles associated with non-disk persistent memory, the following discussion describes characteristics that non-disk persistent memory systems can have in order to facilitate their use in the inventive transaction processing systems. Throughout this discussion, a few non-limiting examples of non-disk persistent memory systems are provided.

Non-disk persistent memory, as defined in this document, should exhibit the following properties: durability, connectivity, and access.

Durability refers to non-disk persistent memory that is durable, without refresh, and which can survive the loss of system power. It should additionally provide durable, self-consistent metadata in order to ensure continued access to the data stored on the non-disk persistent memory after power loss or soft failures.

With respect to connectivity, consider the following. Non-disk persistent memory may attach to memory controllers available with commercial chipsets. While special purpose memory controllers may be eventually designed to exploit the durability of non-disk persistent memory in a unique fashion, their existence is not required. In those cases where direct connectivity to a CPU's memory controller is not desirable—perhaps due to fault-tolerance implications, packaging considerations, physical slot limitations, or electrical load limits—first-level I/O attachment of non-disk persistent memory is permitted. For instance, non-disk persistent memory may be attached to PCI and other first-level I/O interconnects, such as PCI Express, RDMA over IP, InfiniBand, Virtual Interface over Fibre Channel (FC-VI) or ServerNet. Such interconnects support both memory mapping and memory-semantic access. This embodiment of non-disk persistent memory is referred to as a Communication-link Attached Persistent Memory Unit (CPMU).

Storage connectivity (e.g., SCSI)—or indeed any other second-level I/O connectivity—is not desirable for persistent memory due to performance considerations identified below.

Figure 3:
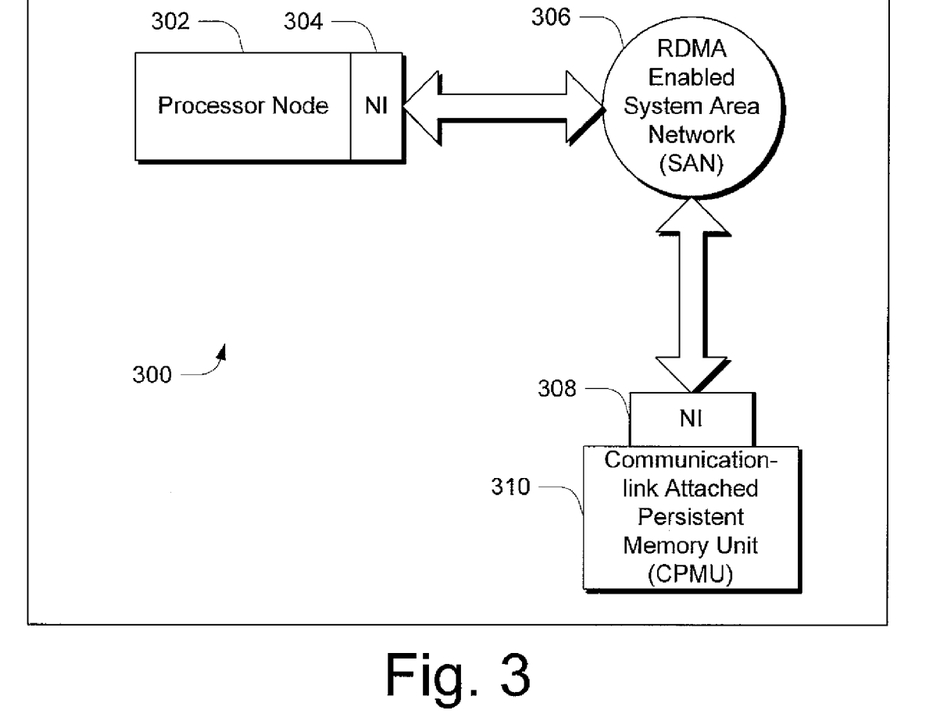
FIG. 3 illustrates one exemplary embodiment of a non-disk persistent memory unit.

With respect to access, consider the following. Non-disk persistent memory may be accessed from user programs like ordinary virtual memory, albeit at specially designated process virtual addresses, using the CPU's memory instructions (Load and Store). On certain system area networks (i.e. SANs) that support memory-semantic operations, non-disk persistent memory may be implemented as a network resource that is accessed using remote DMA (RDMA), or similar semantics. For example, FIG. 3 shows a system 300 using network attached non-disk persistent memory comprising a communication-link attached non-disk persistent memory unit (CPMU) 310 that can be accessed by one or more processor nodes 302 through an RDMA-enabled system area network (SAN) 306. In order to access the non-disk persistent memory of CPMU 310, software running on the processor node 302 initiates remote read or write operations through the processor node's network interface (NI) 304. In this manner read or write commands are carried on RDMA-enabled SAN 306 to the CPMU's network interface (NI) 308. Accordingly, after processing, the appropriate data is communicated over the RDMA-enabled SAN 306.

In addition to RDMA data movement operations, CPMU 310 can be configured to respond to various management commands. In a write operation initiated by processor node 302, for example, once data have been successfully stored in the CPMU, they are durable and will survive a power outage or processor node 302 failure. In particular, memory contents will be maintained as long as the CPMU continues to function correctly, even after the power has been disconnected for an extended period of time, or the operating system on processor node 302 has been rebooted. In this example, processor node 302 is a computer system consisting of at least one central processing unit (CPU) and memory wherein the CPU is configured to run an operating system. Processor node 302 is additionally configured to run application software such as databases. Processor node 302 uses SAN 306 to communicate with other processor nodes 302 as well as with devices such as CPMU 310 and I/O controllers (not shown).

In one implementation of this example, an RDMA-enabled SAN is a network capable of performing byte-level memory operations such as copy operations either between an initiator processor node 302 and a target processor node 302, or between an initiator processor node 302 and a device 310, without notifying the CPU of target processor node 302. In this case, SAN 306 is configured to perform virtual-to-physical address translation in order to enable the mapping of contiguous network virtual address spaces onto discontiguous physical address spaces. This type of address translation allows for dynamic management of CPMU 310. Commercially available SANs 306 with RDMA capability include, but are not limited to ServerNet, RDMA over IP, Infiniband, and all SANs compliant with Virtual Interface Architecture.

Processor nodes 302 are generally attached to a SAN 306 through the NI 304, however, many variations are possible. More generally, however, a processor node need only be connected to an apparatus for communicating read and write operations. For example, in another implementation of this example, processor nodes 302 are various CPUs on a motherboard and, instead of using a SAN, an Input/Output bus is used, for example a PCI bus. It is noted that the present teachings can be scaled up or down to accommodate larger or smaller implementations as needed.

Network interface (NI) 308 is communicatively coupled to CPMU 310 to allow for access to the non-disk persistent memory contained within CPMU 310. Many technologies are available for the various components of FIG. 3, including the type of memory technology used inside the CPMU 310. Accordingly, the embodiment of FIG. 3, as well as the others described in this document, is not limited to a specific technology for realizing the non-disk persistent memory. Indeed, multiple memory technologies, including magnetic random access memory (MRAM), magneto-resistive random access memory (MRRAM), polymer ferroelectric random access memory (PFRAM), ovonics unified memory (OUM), battery backed-up dynamic access memory (BBDRAM), and FLASH memories of all kinds are appropriate.

Where SAN 306 is used, memory should be fast enough for RDMA access. In this way, RDMA read and write operations are made possible over SAN 306. Where another type of communication apparatus is used, the access speed of the memory used should also be fast enough to accommodate the communication apparatus. It should be noted that persistent information is provided to the extent the non-disk persistent memory in use may hold data. For example, in many applications, non-disk persistent memory may be required to store data regardless of the amount of time power is lost; whereas in another application, non-disk persistent memory may only be required for a few minutes or hours.

In conjunction with this approach, memory management functionality is provided for creating single or multiple independent, indirectly-addressed memory regions. Moreover, CPMU meta-data is provided for memory recovery after loss of power or processor failure. Meta-data or information includes, for example, the contents and the layout of the protected memory regions within an CPMU. In this way, the CPMU stores the data and the manner of using the data. When the need arises, the CPMU can then allow for recovery from a power or system failure.

Figure 4:
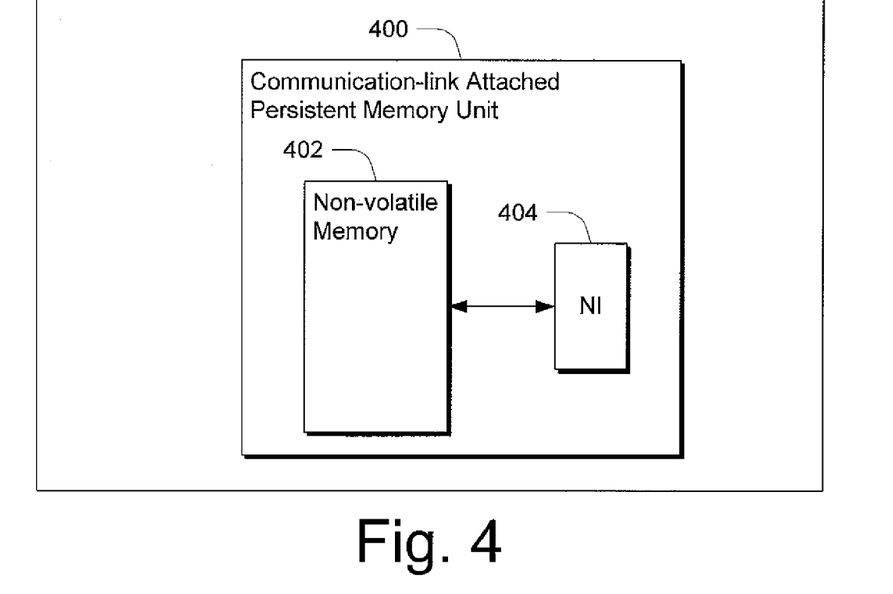
FIG. 4 illustrates one exemplary embodiment of a non-disk persistent memory unit.

In FIG. 4, CPMU 400 comprises non-disk, non-volatile memory 402 and a network interface or NI 404 coupled together via a data communication link such as a bus. Here, non-disk, non-volatile memory 402 can be, for example, MRAM or Flash memory. NI 404 does not initiate its own RDMA requests, but instead NI 404 receives management commands from the network and carries out the requested management operations. Specifically, CPMU 400 translates the address on each incoming memory-access request and then internally initiates the requested memory operation over the data communication link between NI 404 and non-volatile memory 402.

Figure 5:
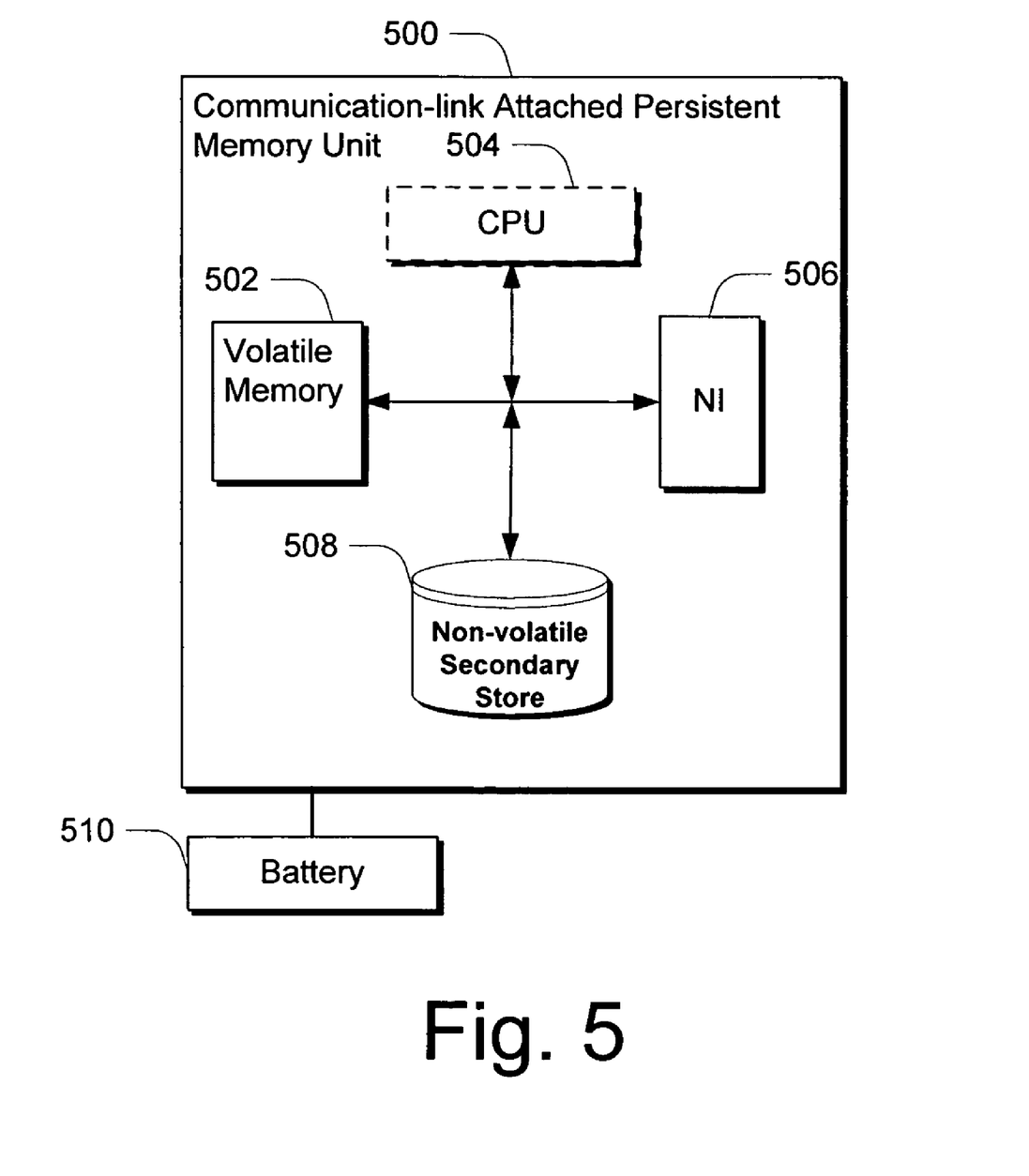
FIG. 5 illustrates another exemplary embodiment of a non-disk persistent memory unit.

In FIG. 5, another embodiment of CPMU 500 uses a combination of non-disk volatile memory 502 with battery 510 and a non-volatile secondary store 508. In this embodiment, when power fails, the data within non-disk volatile memory 502 is preserved using the power of battery 510 until such data can be saved to non-volatile secondary store 508. Non-volatile secondary store can be, for example, a magnetic disk or slow FLASH memory. For CPMU 500 to operate properly, the transfer of data from volatile memory 502 to non-volatile secondary memory store 508 should occur without external intervention or any further power other than that from battery 510. Accordingly, any required tasks should be completed before battery 510 can discharge.

As shown, CPMU 500 includes an optional CPU 504 running an embedded operating system.

Accordingly, the backup task (i.e., data transfer from non-disk volatile memory 502 to non-volatile secondary memory store 508) can be performed by software running on CPU 504. The included NI 506 may be used by software running on CPU 504 to initiate RDMA requests or to send messages to other entities on SAN 306. Here again, CPU 504 receives management commands from the network through NI 506 and carries out the requested management operation.

Any embodiment of the CPMU, such as CPMU 400 or 500, has to be managed for the purposes of persistent memory allocation and sharing. In this example, CPMU management is carried out by a persistent memory manager (PMM). The PMM can be located within the CPMU or outside the CPMU such as on one of the previously described processor nodes 302. When a processor node 302 needs to allocate or de-allocate non-disk persistent memory in the CPMU 310, or when it needs to starts or stop using an existing region of non-disk persistent memory therein, the processor node should first communicate with the PMM to perform requested management tasks. Note that because CPMU 310 memory contents are durable Oust like disk drives), the meta-data related to non-disk persistent memory regions within that CPMU must also be durable, maintained consistent with those regions, and preferably stored within the CPMU itself (just like file system meta-data on disk drives). The PMM must therefore perform management tasks in a manner that will always keep the meta-data of CPMU 310 consistent with the contents of its non-disk persistent memory. Thus, data stored in CPMU 310 can be meaningfully retrieved using the stored meta-data even after a possible loss of power, system shutdown or other failure impacting one or more of PMM, CPMU 310 and processor nodes 302. Upon a need for recovery, the system 300 using CPMU 310 is thus able to recover and resume its operation from the memory state in which a power failure or operating system crash occurred.

In those systems 300 where it is not feasible to use LOAD and STORE memory instructions of processing node 302 to directly or indirectly initiate RDMA data transfers over SAN 306, the reading and writing of CPMU 310 contents will require applications running on processing nodes 302 to initiate RDMA using an application programming interface, or API.

As should be apparent, one of the reasons non-disk persistent memory is appealing is because it supports finer-grain (meaning, smaller in size of access) read and write operations against durably stored data than do disk drives. That fine grain applies to both access size (how many bytes are read or written) and access alignment (the offset within a non-disk persistent memory region of the first byte that is read or written). Data structures within a non-disk persistent memory region can be aligned freely, thereby permitting more efficient and efficacious use of capacity than with disks. Another benefit relative to block-oriented disk storage and FLASH memories is that it is not necessary to read a large block of data first, before a small piece of it can be modified and written back; instead, a write operation can simply modify just those bytes that need to be altered. The raw speed of non-disk persistent memory is also appealing. Access latency is an order of magnitude better than that of disk drives. The relative ease of use of non-disk persistent memory compared to disk drives is significant also because of the fact that pointer-rich data structures can be stored into non-disk persistent memory without having to first convert all pointers into relative byte addresses at the time of writing, and then reconvert relative byte addresses back into pointers at the time of reading. These so-called marshalling-unmarshalling overheads can be quite significant for complex data structures. All of the above factors can enable application programmers to not only speed up the access and manipulation of the data structures they already make persistent, but also to consider making persistent certain data structures they would not have considered making persistent with slower storage devices, such as disk drives and FLASH memory. The greater the degree of persistence in an information processing system, the easier and faster it is to recover from failures because of smaller loss of information. Faster recovery implies greater system availability. The net benefit of the described embodiments is therefore not merely in performance but also in greater availability. In mission-critical transaction processing systems, where there is a high cost associated with lack of system availability, the availability benefits of the described embodiments are in fact likely to be of even greater value than the performance benefits. Moreover, new or improved database features can become possible through the use of the described embodiments, such as in-memory operation. Applications other than databases can also exploit the improved performance and availability of system 300 to deliver new customer capabilities. While too numerous to list here, many of those applications will be apparent to one skilled in the art. One such application is described next.

Using Non-Disk Persistent Memory to Reduce Transaction Commit Times

With respect to the transaction processing system 100 of FIG. 1, in the absence of non-disk persistent memory, two things must happen before the transaction monitor 104 can commit a database transaction. First, the log writer 106 must flush out (or completely write) to durable media any audit information pertaining to that transaction received from database writers 102. Thereafter, the transaction monitor 104 must also write to durable media the commit record for that transaction. In accordance with the described embodiments, utilizing non-disk persistent memory can allow transactions to commit after having written those items of information only to non-disk persistent memory. To the extent that non-disk persistent memory exhibits lower latency for write operations than disk storage, transaction latencies can be accordingly shortened (and TMF transaction throughput possibly improved).

Specifically with respect to FIG. 2, the ADPs 206, upon receiving a flush message from TMP 204, can synchronously flush unwritten state changes and transaction-commit records an order-of-magnitude faster when writing to non-disk persistent memory than when writing to disk storage. The faster write operations allow TMP to commit the transaction sooner when ADPs 206 use non-disk persistent memory than if they were to use disks.

Figure 6:
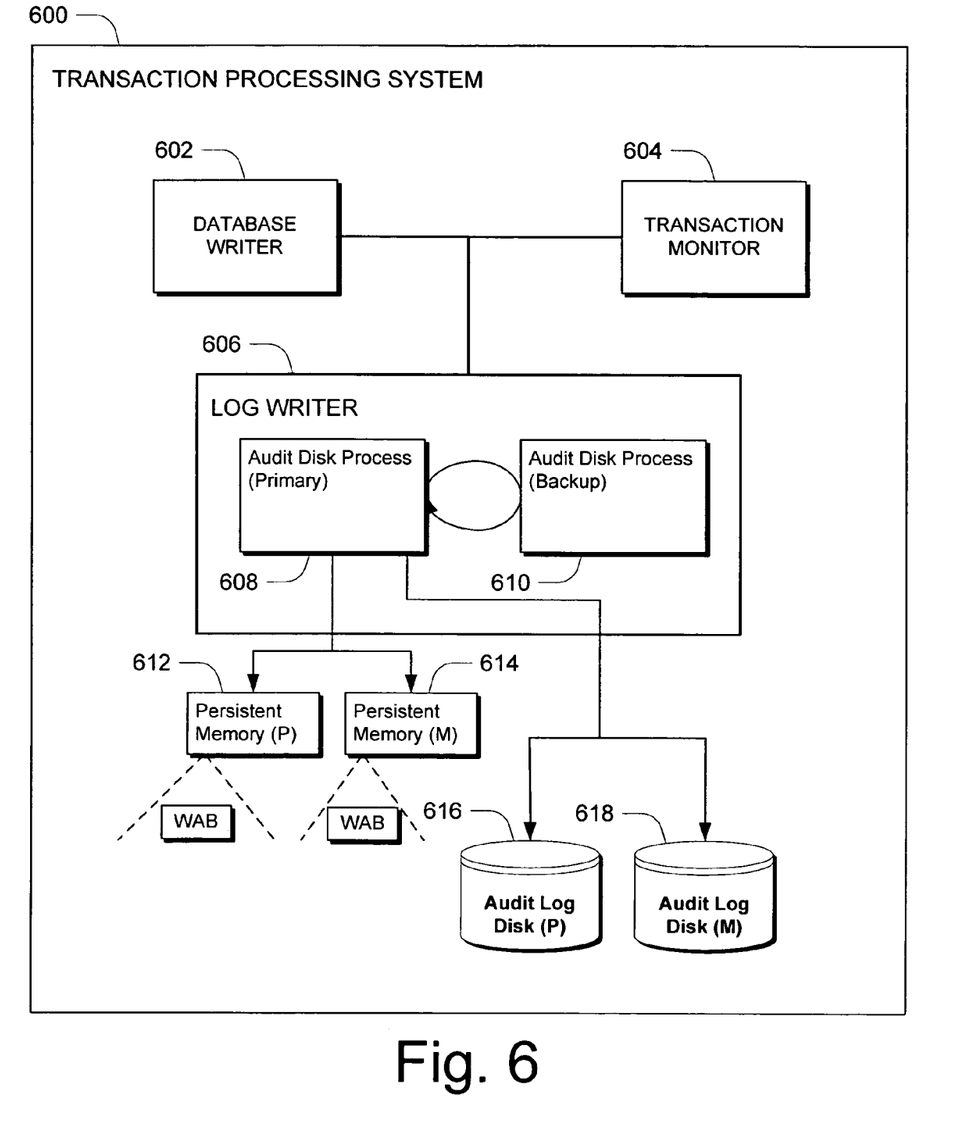
FIG. 6 illustrates an exemplary transaction processing system that utilizes non-disk persistent memory units in accordance with one or more embodiments.

As an example, consider FIG. 6 which shows a transaction processing system in accordance with one embodiment generally at 600. System 600 comprises a database writer 602, a transaction monitor 604 and a log writer 606.

In accordance with the described embodiment, log writer 606 comprises a primary audit disk process 608 and a backup disk process 610. A pair of non-disk persistent memory units is provided and comprises a primary non-disk persistent memory unit 612 (also referred to as a "CPMU") and a mirror non-disk persistent memory unit 614 (also referred to as a "CPMU"). A primary audit log disk 616 and a mirror audit disk log 618 are provided for purposes which will become apparent below.

In the illustrated and described embodiment, data is written to both the primary non-disk persistent memory unit 612 and the mirror non-disk persistent memory unit 614. In some embodiments, data can be written to the primary and mirror units concurrently. Alternately, in some embodiments, data need not be written to the primary and mirror units concurrently. If the system is fully functional, in some embodiments, information is read from either the primary non-disk persistent memory unit 612 or mirror non-disk persistent memory unit 614. If only one of the non-disk persistent memory units (612, 614) should fail, then data will be read from the surviving non-disk persistent memory unit. Once a failed primary non-disk persistent memory unit is ready to be put back into service, its contents may be restored from the surviving non-disk persistent memory unit.

In the illustrated and described embodiment, one region per audit trail is allocated within each of the non-disk persistent memory units 612, 614 and the audit disk process pair 608, 610 maintains a write-aside buffer (designated as "WAB") within each of those regions. Although any suitable write-aside buffer configuration can be used, in the present example, the write aside buffer is configured as a circular buffer as will be appreciated by the skilled artisan. As the primary audit disk process 608 receives the set of changes from the database writer 602, it uses the non-disk persistent memory units 612, 614 to very quickly commit those changes. Specifically, in the illustrated example, when ADP 608 receives the set of changes, it adds the information into the WAB of CPMU 612 at that WAB's tail address and then advances the WAB's tail address to point past the end of the most recently written information. It then repeats the operation with the WAB of CPMU 614. Skilled artisans will be able to vary the degree of concurrency between the write operations to CPMUs 612, 614.

In accordance with the described embodiment, write operations to a non-disk persistent memory region are suspended, and the WAB is marked full, if completing a requested write operation would advance the tail pointer past a head address in the WAB. Algorithms for advancing the WAB's head and tail address resemble the textbook approach to implementing circular queue data structures, except that the head address and the tail address of a WAB are both also stored and updated within the same non-disk persistent memory region that contains the WAB's circular buffer, as will be appreciated by the skilled artisan.

With cost-effective non-disk persistent memory, slower disk I/O may be completely eliminated from the transaction commitment process as log volumes are realized entirely using the higher-speed persistent memory devices instead of disks. However, presently and in the near future, it is likely that disk capacities will continue to greatly exceed non-disk persistent memory capacities, and that the cost per byte of disk storage will continue to be substantially lower than the cost per byte of non-disk persistent memory. In that case, relatively smaller-capacity non-disk persistent memory units will be used to implement WABs for relatively larger-capacity disk drives. In such arrangements, and in similar designs, synchronously written audit information will be lazily and asynchronously written to the disks. A variety of techniques for selecting which information to retain in non-disk persistent memory and which to flush to disk will be apparent to one skilled in the art of memory hierarchy design.

Moreover, with such cost-constrained non-disk persistent memory technology just described, ADP 608 can continue using disk write operations, but it will not need to wait for those disk operations to complete before it can allow TMP 604 to commit transactions. Instead, ADP 608 will eagerly and synchronously write all audit information received from database writers 602 to non-disk persistent memory devices 612, 614, albeit exercising the option to combine the information from multiple messages received within a suitably selected interval of time. Since the disk operations are no longer being waited on as described above, ADP 608 can now write more data per disk operation, thereby incurring fewer I/O-related overheads by doing fewer total operations for the same quantity of audit trail data. This improves disk throughput from audit disks 616, 618, as well as improves CPU utilization for the CPUs that run ADPs 608. Therefore, when the ADP 608 receives a request from TMP 604 to flush its audit trail, it first writes that information to CPMUs 612, 614. It also buffers that information in the WAB so that the information can be written to the audit log disks 616, 618 in a so-called lazy fashion. Once a predetermined condition is met, e.g. a certain threshold on buffered information is exceeded, or at a maximum fixed time interval, ADPs 608 issue disk write operations regardless of whether a flush message has been received from TMP 604. However, unlike in the conventional case, transactions may commit before the audit information has been written to disks 616, 618 but after it has been written to CPMUs 612, 614.

When lazily issued sequential write operations to audit disks 616, 618 complete, some of the information that had been stored in WABs becomes eligible to be overwritten. The head addresses in the appropriate regions of CPMUs 612, 614 are then advanced past the last byte that was successfully written back. If the non-disk persistent memory unit had been marked "full" before the disk I/O completion was received by ADP 608, it is then marked "not full." ADP 608 can then once again resume the use of the WAB. Whenever ADP 608 suspends its use of WAB, it reverts back to waiting for outstanding disk I/Os to log volumes 616, 618 before committing transactions. In such a circumstance, the size of write I/O operations will usually be set to a value (e.g. 4 KB to 128 KB, depending on the amount of audit collected between commit records) smaller than the one that yields optimal disk throughput (e.g. 128 KB to 1 MB) in order to limit the impact of disk I/O latency on transaction response time. With non-disk persistent memory, transactions do not wait for disk I/O to complete, so the ADP 608 can wait until there is more audit data buffered for writing. It is therefore able to use larger disk write I/O sizes (e.g. 512 KB) to get near-optimal throughput to log volumes 616, 618 and to substantially reduce the disk I/O overheads on the CPU that runs ADP 608.

Similar design modifications can be used to create a write-aside buffer using non-disk persistent memory for any other application whose performance is adversely impacted by waiting for disk write operations.

Other variations on the design will be apparent to the skilled artisan. For instance, instead of writing to the primary non-disk and mirror non-disk persistent memory units serially, one after the other, applications may choose to write to them concurrently.

Exemplary Method

Figure 7:
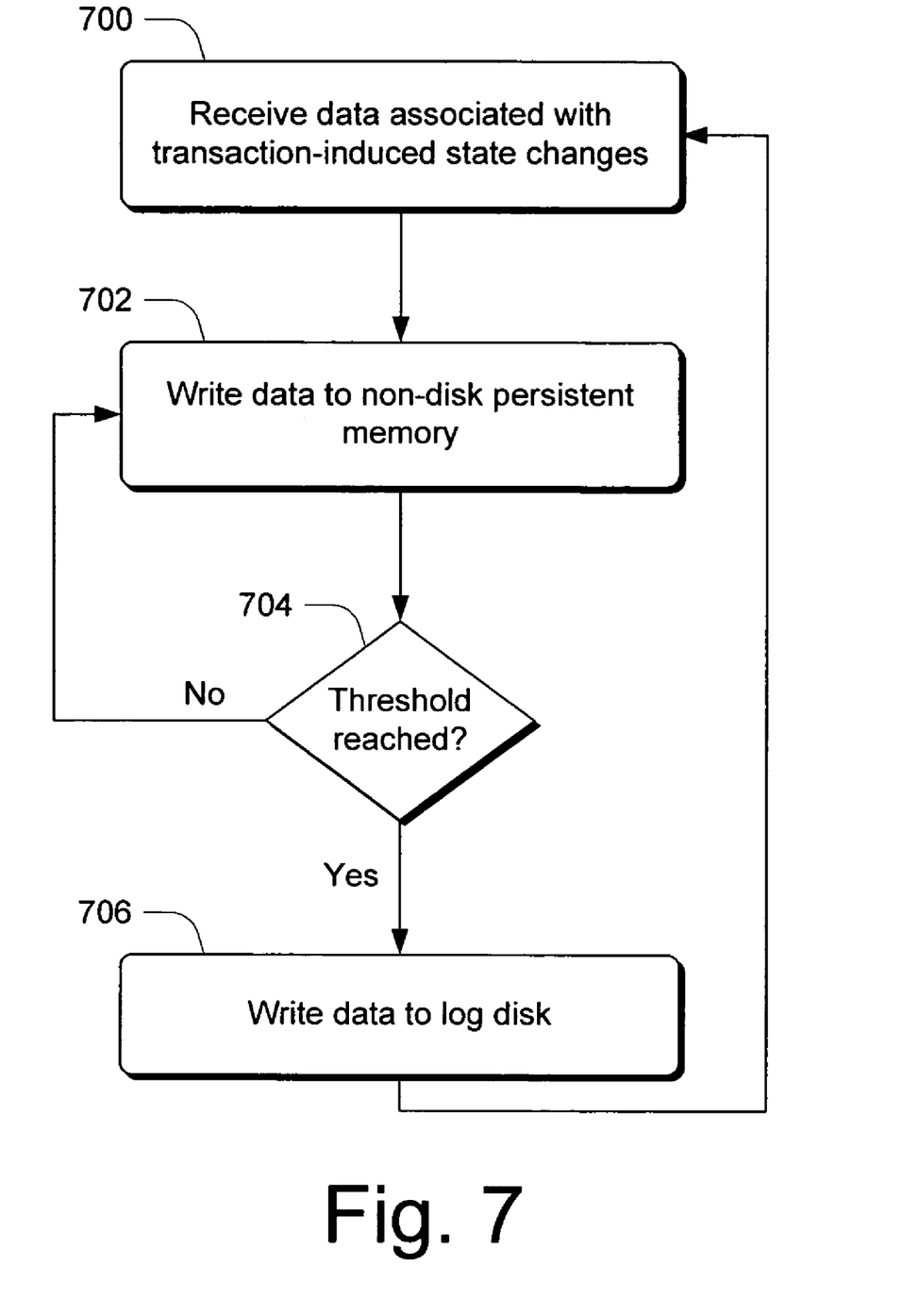
FIG. 7 is a flow diagram that describes steps in a method in accordance with one embodiment.

FIG. 7 illustrates steps in a method in accordance with one embodiment. In the illustrated and described embodiment, the method can be implemented in any suitable hardware, software, firmware or combination thereof. In addition, the method can be implemented using any suitably configured non-disk persistent memory architecture. Specific non-limiting examples of non-disk persistent memory architectures are shown and described throughout this document.

Step 700 receives data associated with transaction-induced state changes. Such data can describe database state changes that are caused as a result of the transaction. In the illustrated and described embodiment, this data is received from a database writer component such as those described above. Step 702 writes the data to non-disk persistent memory. As noted, any suitable non-disk persistent memory architecture can be utilized. For example, in the example of FIG. 6, primary non-disk and mirror non-disk persistent memory units are utilized. Step 704 ascertains whether a non-disk persistent memory unit threshold has been reached. If not, the method returns to step 702. If, on the other hand, the non-disk persistent memory unit threshold has been reached, then step 706 writes the data in non-disk persistent memory to the audit log disk, such as audit log disk 616 in FIG. 6. In the FIG. 6 example, writing to the audit log disk in this fashion is referred to as being done in a lazy fashion.

Exemplary Computer System

Figure 8:
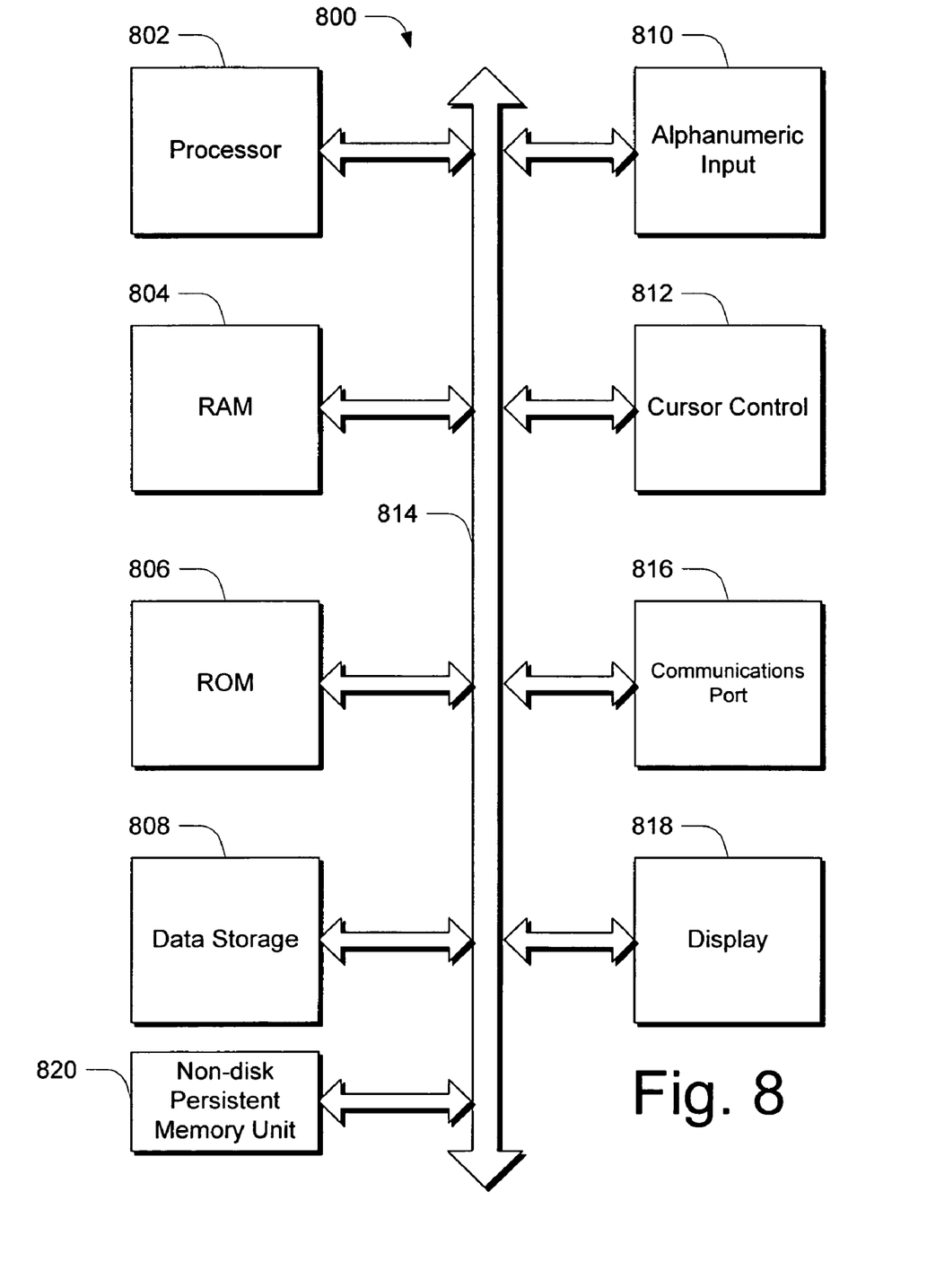
FIG. 8 illustrates an exemplary computer system that can be utilized to practice one or more of the embodiments described herein.

In one embodiment, the above-described systems can be practiced on a computer system 800 such as the one shown in FIG. 8. Computer system 800, or various combinations of its constituent components, can be utilized to implement the above-described systems including the processor nodes, as well as the various non-disk persistent memory units.

Referring to FIG. 8, an exemplary computer system 800 (e.g., personal computer, workstation, mainframe, etc.) is configured with a data bus 814 that communicatively couples various components. As shown in FIG. 8, a processor 802 is coupled to bus 814 for processing information and instructions. A computer readable volatile memory such as RAM 804 is also coupled to bus 814 for storing information and instructions for the processor 802. Moreover, computer-readable read only memory (ROM) 806 is also coupled to bus 814 for storing static information and instructions for processor 802. A data storage device 808, such as a magnetic or optical disk media is also coupled to bus 814. Data storage device 808 is used for storing large amounts of information and instructions. An alphanumeric input device 810 including alphanumeric and function keys is coupled to bus 814 for communicating information and command selections to the processor 802. A cursor control device 812 such as a mouse is coupled to bus 814 for communicating user input information and command selections to the central processor 802. Input/output communications port 816 is coupled to bus 814 for communicating with a network, other computers, or other processors, for example. Display 818 is coupled to bus 814 for displaying information to a computer user. Display device 818 may be a liquid crystal device, cathode ray tube, or other display device suitable for creating graphic images and alphanumeric characters recognizable by the user. The alphanumeric input 810 and cursor control device 812 allow the computer user to dynamically signal the two dimensional movement of a visible symbol (pointer) on display 818. A non-disk persistent memory unit 820 is provided and can comprise any of the embodiments described above, as well as other non-disk persistent memory architectures that exhibit the behaviors described above, as will be appreciated by the skilled artisan.

CONCLUSION

Various embodiments described above utilize non-disk persistent memory in connection with transaction processing systems. By using non-disk persistent memory to commit transactions, the time associated with committing transactions can be reduced. Thus, the demand for resources inside the transaction processing system can be reduced, which can increase the throughput for transaction processing systems.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A transaction processing system comprising:
   a database writer configured to process data in accordance with one or more transactions within the transaction processing system;
   a transaction monitor for monitoring transactions within the transaction processing system;
   a log writer for maintaining audit trail data associated with transactions within the transaction processing system; and
   one or more non-disk persistent memory units comprising a primary non-disk persistent memory unit and a mirror non-disk persistent memory unit, associated with the log writer and configured to receive, from the log writer, audit trail data;
   wherein the log writer is configured to first write audit trail data to the primary non-disk persistent memory unit and then write the audit trail data to the mirror non-disk persistent memory unit.

2. The transaction processing system of claim 1, wherein the log writer comprises a primary audit disk process and a backup audit disk process.

3. The transaction processing system of claim 1, wherein the one or more non-disk persistent memory units comprise a write aside buffer configured to receive the audit trail data, the write aside buffer being configured as a circular buffer.

4. A transaction processing system comprising:
   a database writer configured to process data in accordance with one or more transactions within the transaction processing system;
   a transaction monitor for monitoring transactions within the transaction processing system;
   a log writer for maintaining audit trail data associated with transactions within the transaction processing system;
   one or more non-disk persistent memory units associated with the log writer and configured to receive, from the log writer, audit trail data, wherein the memory units comprise a primary non-disk persistent memory unit and a mirror non-disk persistent memory unit; and
   one or more audit log disks configured to receive audit trail data that is first received by the one or more non-disk persistent memory units;
   wherein the log writer is configured to first write audit trail data to the primary non-disk persistent memory unit and then write the audit trail data to the mirror non-disk persistent memory unit.

5. The system of claim 4, wherein the log writer is configured to cause the audit trail data in the one or more non-disk persistent memory units to be written to the one or more audit log disks when a non-disk persistent memory unit threshold is reached or exceeded.

6. The system of claim 4, wherein the transaction processing system is configured to commit transactions before associated audit trail data is written to the one or more audit log disks.

7. The system of claim 4, wherein the transaction processing system is configured to commits transactions after associated audit trail data is received by the one or more non-disk persistent memory units and before the associated audit trail data is written to the one or more audit log disks.

8. The system of claim 4, wherein the log writer comprises a primary audit disk process and a backup audit disk process.

9. The system of claim 4, wherein the one or more non-disk persistent memory units comprise a write aside buffer configured to receive the audit trail data, the write aside buffer being configured as a circular buffer.

10. A method comprising:
receiving data associated with transaction-induced state changes, wherein the act of receiving is performed by a log writer comprising primary and backup audit disk processes; and
writing the received data to non-disk persistent memory sufficient to commit an associated transaction, wherein the act of writing comprises writing the received data to first and second non-disk persistent memory units.

11. The method of claim 10, wherein the first non-disk persistent memory unit comprises a primary non-disk persistent memory unit and the second non-disk persistent memory unit comprises a mirror non-disk persistent memory unit.

12. The method of claim 10, wherein the first non-disk persistent memory unit comprises a primary non-disk persistent memory unit and the second non-disk persistent memory unit comprises a mirror non-disk persistent memory unit and the act of writing comprises first writing the received data to the primary non-disk persistent memory unit and then writing the received data to the mirror non-disk persistent memory unit.

13. The method of claim 10, wherein the first non-disk persistent memory unit comprises a primary non-disk persistent memory unit and the second non-disk persistent memory unit comprises a mirror non-disk persistent memory unit and the act of writing comprises concurrently writing the received data to the primary non-disk persistent memory unit and the mirror non-disk persistent memory unit.

14. The method of claim 10 further comprising after writing the received data to the non-disk persistent memory, writing the transaction-induced state change data to one or more audit log disks.

15. The method of claim 10 further comprising after writing the received data to the non-disk persistent memory, writing the transaction-induced state change data to one or more audit log disks, wherein the act of writing the transaction-induced state change data to the one or more audit log disks comprises doing so responsive to a threshold associated with the non-disk persistent memory being reached or exceeded.

16. A method comprising:
maintaining at least two write aside buffers in non-disk persistent memory, a first of the buffers comprising a primary buffer, a second of the buffers comprising a mirror buffer;
synchronously flushing audit data associated with one or more transactions to said at least two write aside buffers, wherein said act of synchronously flushing is sufficient to commit an associated transaction; and
when a predetermined condition is met, writing the audit data in the write aside buffers to one or more audit log disks.

17. The method of claim 16, wherein the act of maintaining comprises maintaining said buffers as circular buffers.

18. The method of claim 16, wherein the predetermined condition comprises a threshold condition.

19. The method of claim 16, wherein said acts are performed by a transaction processing system that comprises a database writer component, a transaction monitor component and a log writer component, each component being implemented as a primary-backup process pair.

20. A method comprising:
receiving data associated with transaction-induced state changes; and
writing the received data to non-disk persistent memory sufficient to commit an associated transaction, wherein the act of writing comprises writing the received data to first and second non-disk persistent memory units, the first non-disk persistent memory unit comprising a primary non-disk persistent memory unit, the second non-disk persistent memory unit comprising a mirror non-disk persistent memory unit.

21. A method comprising:
receiving data associated with transaction-induced state changes; and
writing the received data to non-disk persistent memory sufficient to commit an associated transaction, wherein the act of writing comprises writing the received data to first and second non-disk persistent memory units, the first non-disk persistent memory unit comprising a primary non-disk persistent memory unit, the second non-disk persistent memory unit comprising a mirror non-disk persistent memory unit, the act of writing comprising first writing the received data to the primary non-disk persistent memory unit and then writing the received data to the mirror non-disk persistent memory unit.

22. A method comprising:
receiving data associated with transaction-induced state changes; and
writing the received data to non-disk persistent memory sufficient to commit an associated transaction, wherein the act of writing comprises writing the received data to first and second non-disk persistent memory units, the first non-disk persistent memory unit comprising a primary non-disk persistent memory unit, the second non-disk persistent memory unit comprising a mirror non-disk persistent memory unit, the act of writing comprising concurrently writing the received data to the primary non-disk persistent memory unit and the mirror non-disk persistent memory unit.

23. A method comprising:
receiving data associated with transaction-induced state changes;
writing the received data to non-disk persistent memory sufficient to commit an associated transaction, wherein the act of writing comprises writing the received data to first and second non-disk persistent memory units; and
after writing the received data to the non-disk persistent memory, writing the transaction-induced state change data to one or more audit log disks.

24. A method comprising:
receiving data associated with transaction-induced state changes;
writing the received data to non-disk persistent memory sufficient to commit an associated transaction; and
after writing the received data to the non-disk persistent memory, writing the transaction-induced state change data to one or more audit log disks, wherein the act of writing the transaction-induced state change data to the one or more audit log disks comprises doing so responsive to a threshold associated with the non-disk persistent memory being reached or exceeded.

* * * * *

UNITED STATES PATENT AND TRADEMARK OFFICE
CERTIFICATE OF CORRECTION

PATENT NO. : 7,383,290 B2 Page 1 of 1
APPLICATION NO. : 10/797258
DATED : June 3, 2008
INVENTOR(S) : Pankaj Mehra et al.

It is certified that error appears in the above-identified patent and that said Letters Patent is hereby corrected as shown below:

In column 7, line 24, delete "Oust" and insert -- (just --, therefor.

In column 12, line 67, in Claim 7, delete "commits" and insert -- commit --, therefor.

Signed and Sealed this

Twenty-sixth Day of August, 2008

JON W. DUDAS
*Director of the United States Patent and Trademark Office*